United States Patent
Lukoshkov et al.

(10) Patent No.: US 12,366,989 B2
(45) Date of Patent: Jul. 22, 2025

(54) TECHNOLOGIES TO PROVIDE ACCESS TO KERNEL AND USER SPACE MEMORY REGIONS

(71) Applicant: Intel Corporation, Santa Clara, CA (US)

(72) Inventors: Maksim Lukoshkov, Clarecastle (IE); Tomasz Kantecki, Ennis (IE); Sanjay K. Kumar, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 706 days.

(21) Appl. No.: 17/133,531

(22) Filed: Dec. 23, 2020

(65) Prior Publication Data

US 2021/0149587 A1    May 20, 2021

(51) Int. Cl.
*G06F 3/06*    (2006.01)

(52) U.S. Cl.
CPC .......... *G06F 3/0655* (2013.01); *G06F 3/0604* (2013.01); *G06F 3/0679* (2013.01)

(58) Field of Classification Search
CPC .... G06F 3/0655; G06F 3/0604; G06F 3/0679; G06F 21/53; G06F 21/78
See application file for complete search history.

(56) References Cited

U.S. PATENT DOCUMENTS

| | | | | |
|---|---|---|---|---|
| 2016/0188465 A1* | 6/2016 | Almasi | .................... | G06F 21/78 |
| | | | | 711/6 |
| 2019/0057040 A1* | 2/2019 | Jiang | .................... | G06F 12/1009 |
| 2019/0114195 A1* | 4/2019 | Jani | ...................... | G06F 11/2023 |
| 2019/0370050 A1* | 12/2019 | Kumar | ................ | G06F 9/30138 |

OTHER PUBLICATIONS

Lu, Baolu, "Assignable Interfaces in Intel Scalable i/o Virtualization in Linux", https://01.org/blogs/2019/assignable-interfaces-intel-scalable-i/o-virtualization-linux, Jun. 19, 2019, 6 pages.
PCI-SIG, "Single Root I/O Virtualization and Sharing Specification Revision 1.1", Jan. 20, 2010, 100 pages.
U.S. Appl. No. 17/133,531, Figures 1-3—Known Prior Art, Aug. 2019.

* cited by examiner

*Primary Examiner* — Francisco A Grullon
(74) *Attorney, Agent, or Firm* — Compass IP Law PC (57) ABSTRACT

Examples described herein relate to a device including circuitry to permit or deny the device to write-to or read-from kernel space memory of a virtualized execution environment by use of multiple process identifiers. In some examples, the device is communicatively coupled with the virtualized execution environment in a manner consistent with one or more of: Single Root IO Virtualization (SR-IOV), Scalable I/O Virtualization (SIOV), or PCI express (PCIe). In some examples, to control write or read operations to kernel space memory of a virtualized execution environment by the device by use of multiple process identifiers, the circuitry is to perform an address translation based on a first process identifier and second process identifier associated with the virtualized execution environment.

19 Claims, 9 Drawing Sheets

TECHNOLOGIES TO PROVIDE ACCESS TO KERNEL AND USER SPACE MEMORY REGIONS

DESCRIPTION

Peripheral Component Interconnect Special Interest Group (PCI-SIG) Single Root IO Virtualization (SR-IOV) and Sharing Specification v1.0 (2007) and predecessor and successor versions describe use of a single PCI express (PCIe) physical device under a single root port to appear as multiple separate physical devices to a hypervisor or guest operating system. A single-root I/O virtualization (SR-IOV) is a specification that allows a single PCIe physical device under a single root port to appear as multiple separate physical devices to a hypervisor or guest operating system. SR-IOV uses physical functions (PFs) and virtual functions (VFs) to manage global functions for the SR-IOV devices. PFs can be PCIe functions that are capable of configuring and managing the SR-IOV functionality. For example, a PF can configure or control a PCIe device, and the PF has ability to move data in and out of the PCIe device. For example, for a network adapter, the PF is a PCIe function of the network adapter that supports SR-IOV. The PF includes capability to configure and manage SR-IOV functionality of the network adapter, such as enabling virtualization and managing PCIe VFs. A VF is associated with a PCIe PF on the network adapter, and the VF represents a virtualized instance of the network adapter. A VF can have its own PCI configuration space but can share one or more physical resources on the network adapter, such as an external network port, with the PF and other PFs or other VFs.

In some examples, a host system and network interface controller (NIC) can support use of Intel® Scalable I/O Virtualization (SIOV). An example technical specification for SIOV is Intel® Scalable I/O Virtualization Technical Specification, revision 1.0, June 2018, as well as earlier versions, later versions, and variations thereof. A SIOV capable device can be configured to group its resources into multiple isolated Assignable Device Interfaces (ADIs). SIOV can decompose server resources into micro components that are composable or assignable by an orchestrator. SIOV permits VMs to be isolated from each other so that a VM can be isolated from its noisy neighbor. In other words, a noisy neighbor VM's use of resources can be isolated from resource use of another VM to reduce impact of operation of a noisy neighbor VM on performance of one or more other VMs. A noisy neighbor can include a co-tenant that uses excessive bandwidth, disk I/O, processor and other resources such that such use negatively impacts performance of other tenant's processes.

Direct Memory Access (DMA) transfers from/to each ADI are tagged with a unique Process Address Space identifier (PASID) number. Unlike the coarse-grained device partitioning approach of SR-IOV to create multiple virtual functions (VFs) on a physical function (PF), SIOV enables software to flexibly compose virtual devices utilizing the hardware-assists for device sharing at finer granularity. Critical operations on the composed virtual device can be mapped directly to the underlying device hardware, while non-critical operations can be emulated through device-specific composition software in the host.

Allowing simultaneous user space and kernel space memory accesses can be utilized for different firmware or hardware features, e.g., bandwidth monitoring, errors, latency, exceptions, queue depths, host to device bandwidth, device to host bandwidth, graphics engine metrics, frame buffer memory utilization, bus interface utilization, heartbeat, telemetry, advanced error reporting, user level interrupts (ULI), etc. A Guest VM could use such information to determine if applications running in its context are not experience performance degradation and or stoppage. For example, Data Plane Development Kit (DPDK)-based applications can collect performance metrics of network adapters and Open vSwitch implementations can tune device performance based on metrics. For example, updating the telemetry counters in kernel space can occur to indicate device utilization. Kernel space accesses can be asynchronous and not related to the user space activities. However, allowing SIOV devices to access user space and kernel space memory of a virtual machine (VM) is not supported by SIOV.

Peripheral Component Interconnect Express (PCIe) consistent devices can issue memory read or write requests with a PASID for user space memory accesses and requests without PASID for kernel space memory accesses. For an example of PCIe, see, for example, Peripheral Component Interconnect (PCI) Express Base Specification 1.0 (2002), as well as earlier versions, later versions, and variations thereof. Memory read or write requests provided without a PASID are handled on behalf of a parent PF device on host and are not able to access guest kernel memory. A potential security vulnerability may occur if VMs are able to read or write to memory used by another VM.

Figure 1:
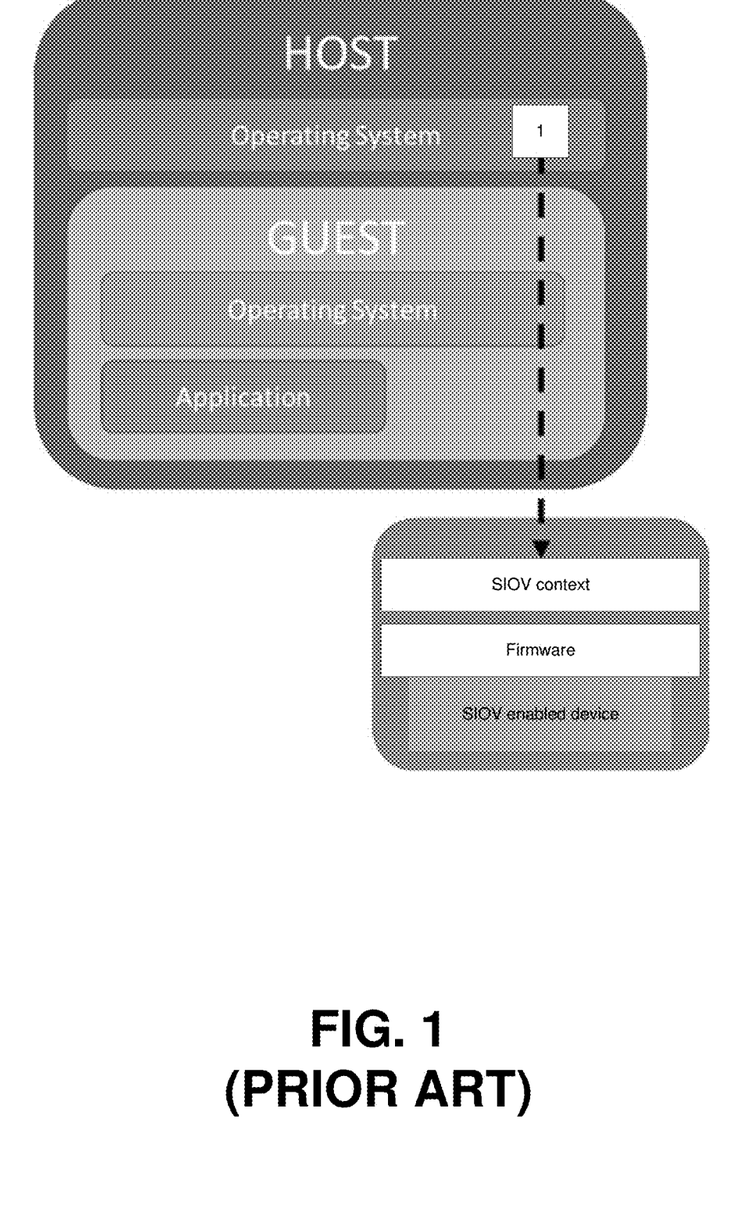
FIG. 1 shows an example system.

FIG. 1 shows an example where a host driver programs a device's SIOV context to prepare the device for application use. The context can include a Process Address Space ID (PASID) that is a user or device identifier assigned by a hypervisor. A PASID value can be encoded in transactions from the device and allow an input-output memory management unit (IOMMU) to track input/output transactions on a per-PASID basis in addition to using the PCIe Resource Identifier (RID) which is the Bus/Device/Function. Action (1) shows a host driver programming a device's SIOV context by writing the context into a device-specific register. However, currently SIOV devices do not permit access (e.g., read and/or write) to both user space memory and kernel space memory of a VM.

Figure 2:
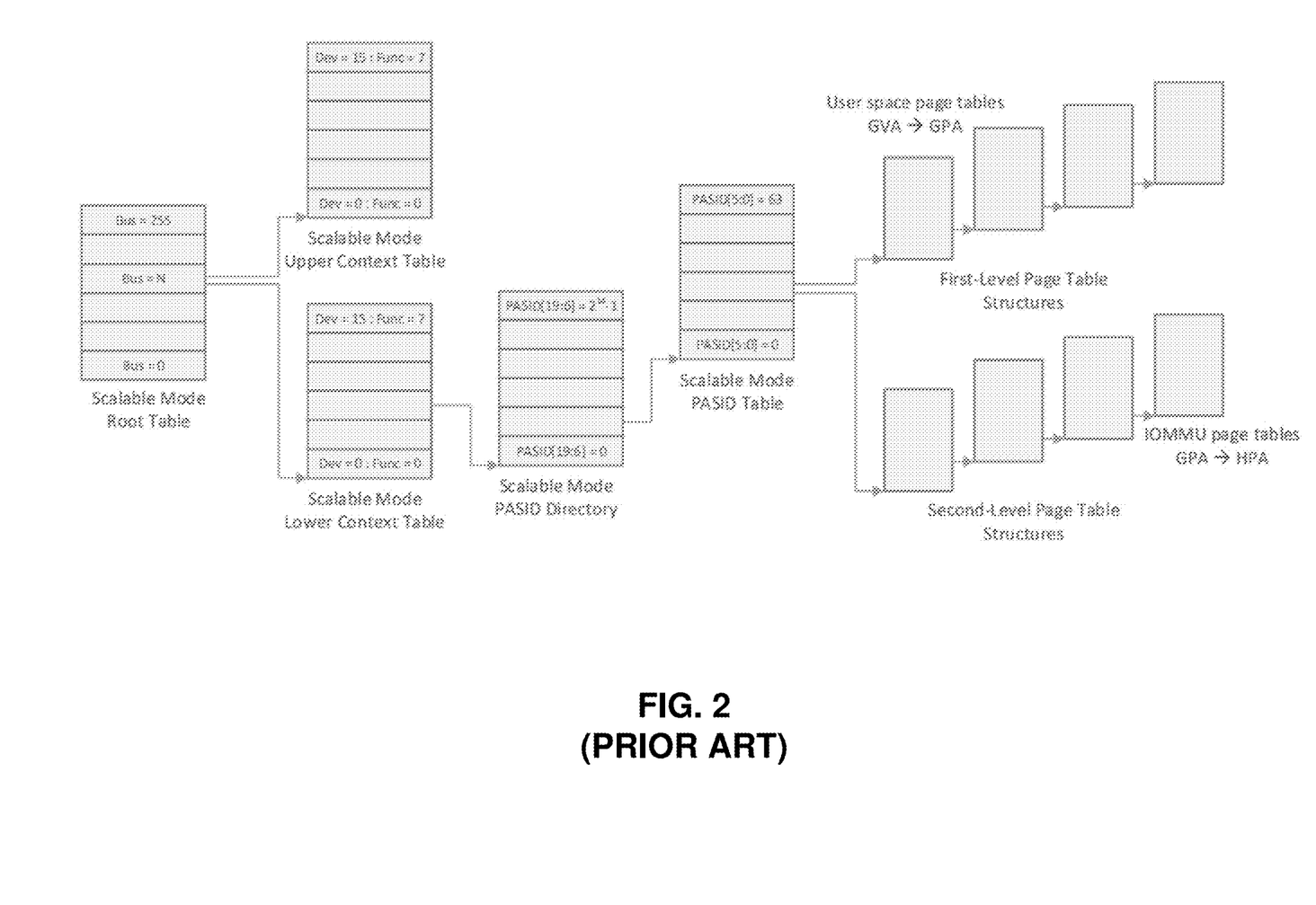
FIG. 2 shows an example address remapping.

FIG. 2 shows an example implementation of SIOV version 3.0 where direct memory access (DMA) address remapping is based on PASID values. In some SIOV implementation, there is only one PASID associated with a device or process. Initially, a PASID is programmed by the hypervisor or host driver and allows limited access to guest IO virtual address (IOVA) memory space. Based on a PASID value, a 2-level address translation scheme can be used involving accessing a pointer associated with the PASID to a translation from guest virtual address (GVA) to guest physical address (GPA) and accessing another pointer for translation from GPA to host physical address (HPA). A source GVA can be any virtual address provided by an application or device. In some cases, access to the kernel space memory of a VM is blocked for a device, due to inability to properly translate a GVA, where memory accesses are translated with a two-level nested address translation scheme because access will be restricted for a process address space.

Figure 3:
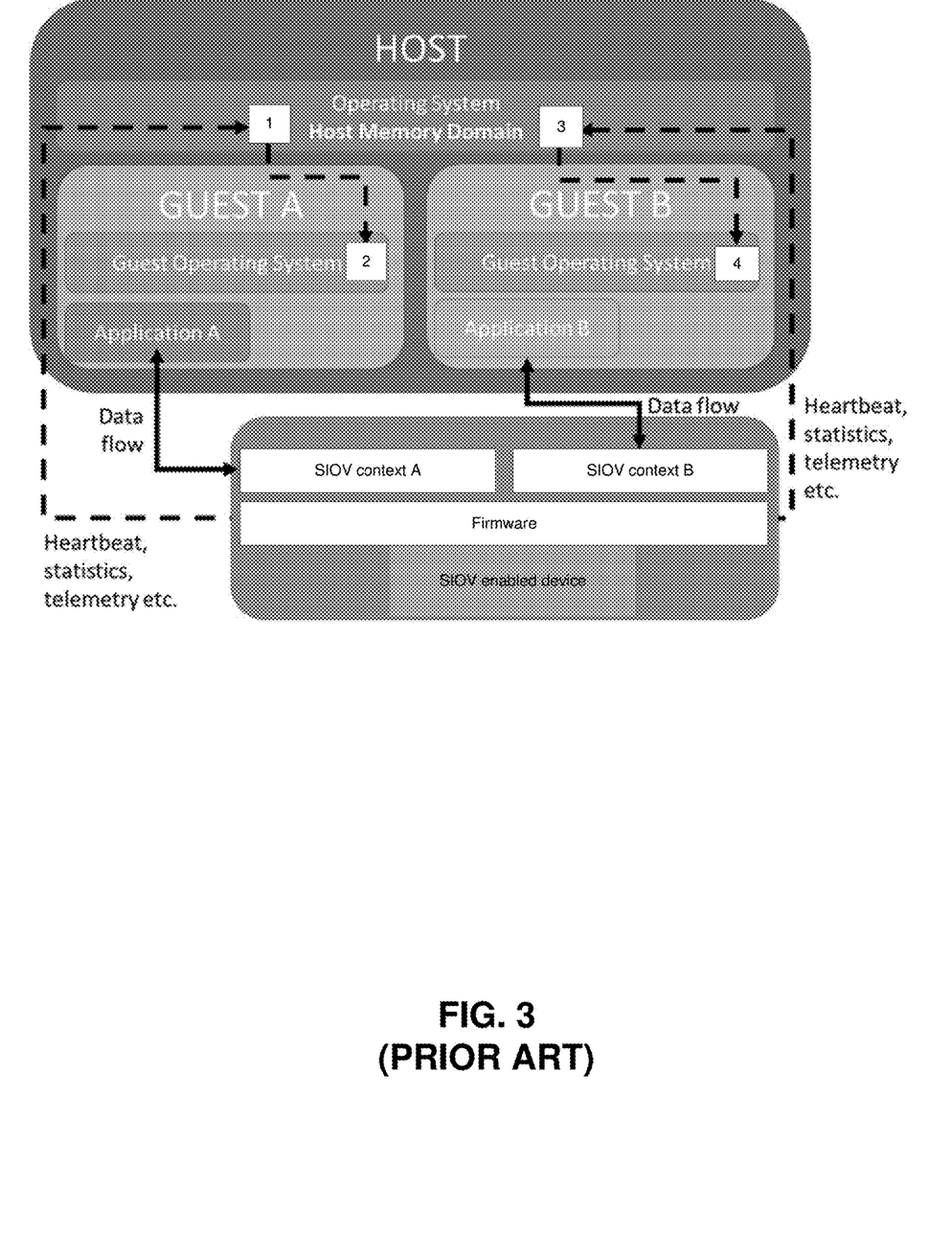
FIG. 3 shows an example system.

FIG. 3 shows an example system with a device that can support multiple SIOV contexts. In this example, at least two memory domains are available, namely, input output virtual addresses (IOVA) (e.g., kernel space) and an application domain. Data flows from different virtual machines can be separate and isolated. SIOV contexts A and B can be accessed by bus, device, and function (BDF) identifiers by a parent physical function (PF) in order to access the host kernel memory. If a hardware device generates data that is not addressed to the application, for an application in a VM to access such data, a host driver (shown as an arrow from 1 to 2 and from 3 to 4) provides availability of the data to the applications. For example, actions 1 and 2 depict a manner in which a device can provide a host operating system (OS) with access to data (e.g., telemetry data, heartbeat, statistics, and so forth) to provide to Application A by a host driver to guest driver communication channel. Similarly, actions 3 and 4 are a manner in which a device can provide a host OS with access to data (e.g., telemetry data, heartbeat, statistics, and so forth) to provide to Application B by a host driver to guest driver communication channel. Actions (1) and (3) are to host kernel memory, action (2) is to guest A kernel memory whereas action (4) is to guest B kernel memory and application domain. Currently, for security reasons, a PASID can be used to access a kernel or application domain, but not both. Accordingly, multiple different application contexts can be resolved by the host driver in the host memory domain by the host OS as the host driver is aware of applications in different VMs. However, utilizing a host driver to provide data availability can introduce latency which may be too high to allow for near real-time statistics and telemetry sharing by a device with an application.

DETAILED DESCRIPTION

Various embodiments allow hardware devices to write to or read from both user space memory and kernel space memory of a VM. Various embodiments provide use of two PASIDs by a single SIOV assignable device interface (ADI) per guest in connection with an address translation to a destination memory address for a direct memory access (DMA) operation from a device to a host. Two PASIDs can include (1) system PASID (sPASID) value and (2) guest PASID value (uPASID). Various embodiments provide a register in hardware to store sPASID for kernel memory accesses inside a VM and a second register to store an uPASID value for the guest IOVA memory access. In a virtualization use case, sPASID can be programmed by a hypervisor and a guest OS or driver may not access or change it, hence it can provide protection against unauthorized uses. However, the uPASID can be accessed and programmed by a guest OS or driver and can allow a user space process in a guest VM to share its virtual address space with the device (vSVM) in order to permit the device to write to user space memory or read from user space memory.

By use of a uPASID, user space memory can be accessed, which can provide a nested (e.g., 2 level) translation from Guest Virtual Address (GVA) to Host Physical Address (HPA) by GVA to guest physical address (GPA) translation and GPA-to-HPA translation. However, using the uPASID alone for a memory address translation, the device is not permitted to access guest kernel memory. However, use of sPASID with uPASID for an address translation can provide access to the kernel space memory whereby the uPASID can be used to identify a translation table for GVA-to-GPA address translation and the sPASID can be used to identify a translation table for GPA-to-HPA address translation. In some examples, the sPASID can be used by the device associated with the ADI to access the guest IOVA space (e.g., pinned memory or DMA address space) whereas the uPASID can be used by the device to access the GVA space.

For example, sPASID with uPASID for an address translation can be used for a device transferring telemetry, heartbeat, etc. to kernel memory space of a virtual machine whereas uPASID can be used for an address translation for a device transferring application payload to user space memory. For example, if a flow includes near-real time data such as telemetry, heartbeat, error reporting, etc., the device can use (1) sPASID with uPASID for initialization and kernel applications and for address translations involving kernel space memory writes or reads. For example, if a flow is an application triggered activity, the device can use uPASID for address translations for payload transfers to user space memory of host system 400 for processing by a guest VM.

If a user space memory is accessed using an address translation involving sPASID, the access can fail due to an invalid memory mapping. If a malicious user space process provides a valid kernel address for a misbehaving device, the access will only corrupt guest memory versus corrupting host memory. If kernel space memory is accessed using an address translation involving uPASID, the access may fail due to an invalid memory mapping. As kernel space accesses are controlled by a kernel driver, a malicious user space process cannot overwrite this address with a valid user space memory mapping.

An operating system (OS) can segregate memory or virtual memory into kernel space and user space to provide memory protection and hardware protection from malicious or errant software behavior. User space can be memory allocated to running applications and some drivers. Processes running under user space may have access to a limited part of memory, whereas the kernel may have access to all of the memory. Kernel space can be memory allocated to the kernel, kernel extensions, some device drivers and the operating system. A kernel can manage applications running in user space. Kernel space can be a location where the code of the kernel is stored and executes within.

An sPASID register, including the sPASID value, may be accessible or programmed by a host operating system, host driver or hypervisor and can provide an additional level of isolation as the sPASID is not modifiable by a guest OS or driver. A host driver can determine which VM is able to access a device. sPASID can be a permanent PASID to be used at any moment of time by the device for accessing guest IOVA memory.

The uPASID register, including the uPASID value, can be accessed and programmable by a guest OS or guest kernel driver and can allow a user space process in a guest VM to share its virtual address space with a device (e.g., vSVM). In some examples, a host driver can be configured to virtualize the uPASID register and perform additional validation steps before programming the required value into a register. The uPASID register contents can be used while an application executing in a VM is active. The uPASID register can be programmable such that a guest kernel driver can change the PASID value because the guest OS can determine when an application executing in a VM starts or terminates. In some examples, a PASID is 32 bits. Various embodiments provide two registers per virtual device to store uPASID and sPASID.

Memory isolation between guest applications of different guest VMs can be achieved. In some cases, an ability for a device to be used to access data from another guest or application deployed on the same host can be reduced.

Various embodiments provide that guest applications and a device can share a memory region independent from a common host memory domain. Memory isolation between guest applications can be improved. In some cases, ability for a device to be used to access data from another guest/application deployed on the same host can be reduced. Various embodiments provide for isolation of data accessible by different guest applications. Various embodiments enable virtualization use cases to allow devices to be used in cloud environment with VM-to-VM isolation.

Figure 4A:
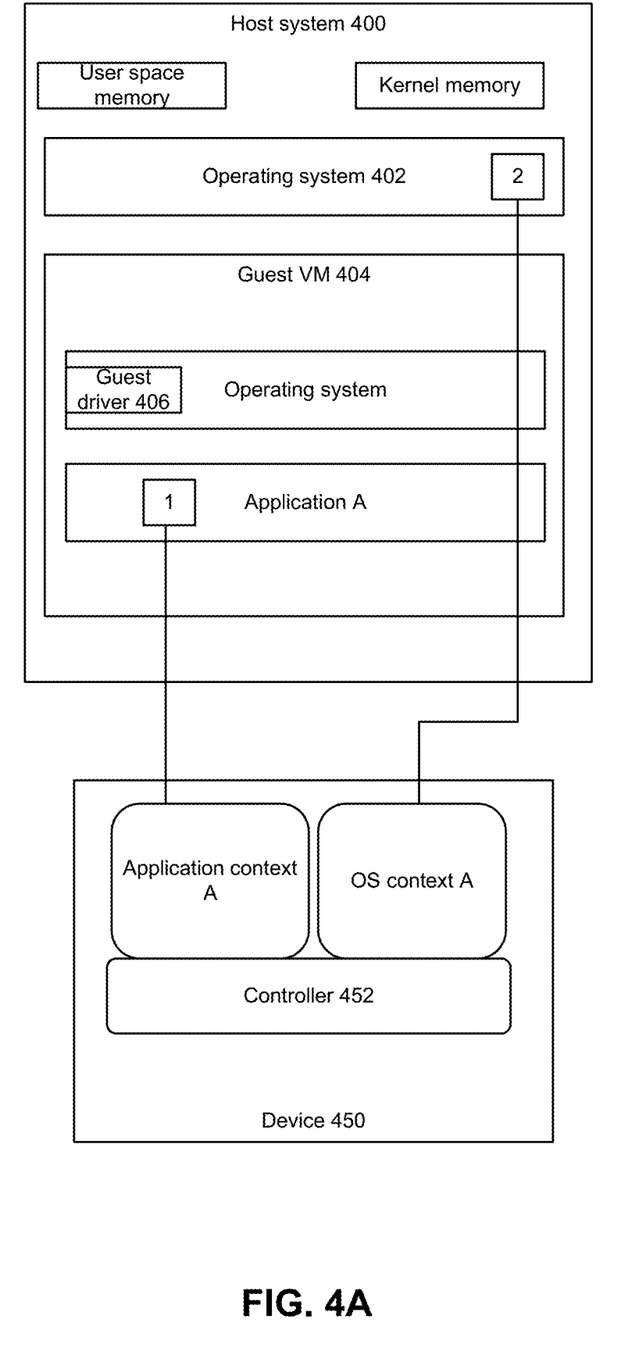
FIGS. 4A and 4B depict configurations of a system.

FIG. 4A shows an example system. Host system 400 can include one or more processors, memory devices, and interfaces for communication with device 450. Various processors (e.g., CPUs or XPUs) can execute a host OS 402 and guest VM 404. According to some embodiments, host driver of operating system 402 performs an initialization step to add an additional context set up in order to provide a permanent access to guest kernel memory. According to some embodiments, a device's SIOV context can be extended with an extra parameter, OS SIOV context (sPASID). Accordingly, two PASID registers can be assigned to store context for guest VM 404, namely, OS SIOV context (sPASID) and application SIOV (uPASID). In some examples, application context A can include a uPASID value whereas OS context A can include sPASID value.

In some examples, device controller 452 (e.g., firmware) can be configured to determine which context is to be used for operations such as guest kernel memory accesses. Accordingly, in some examples, guest driver 406 may be configured to manage flows and data copies managed by a host driver (e.g., Linux or Microsoft OS compatible driver) such as telemetry counter configuration, heartbeat configuration, and so forth copies from device 450 to host system 400.

Various embodiments provide for device 450 and guest applications executing in guest VM 404 to share a memory region independent from a common host memory domain. For example, by use of sPASID with uPASID for an address translation in connection with a memory write operation by device 450 access to kernel space memory of host system 400 can be achieved. For example, sPASID with uPASID can be used for address translations for a device transferring telemetry, heartbeat, or other information. Kernel space memory can be used for telemetry and real-time data in some cases because device management software typically resides in kernel space and may act upon collected data at an increased privilege level. Device management software can expose data to user space for database/log collection and view.

For example, for a device to write to the proper region of memory of host system 400, to access a destination address provided by a guest device driver, device 450 can issue a DMA transaction (read or write) using a DMA device (not shown) using an address translation based on the pre-configured sPASID and uPASID for kernel memory access or using an address translation based on the uPASID for user space memory.

Device 450 can include any type of device, including but not limited to, one or more of: a network interface controller, infrastructure processing unit (IPU), data processing unit (DPU), compression or decompression offload circuitry, encryption or decryption offload circuitry (e.g. Intel® QuickAssist), work load manager (e.g., Intel® Hardware Queue Manager), XPU, storage controller, memory controller, graphics processing unit, and so forth.

Figure 4B:
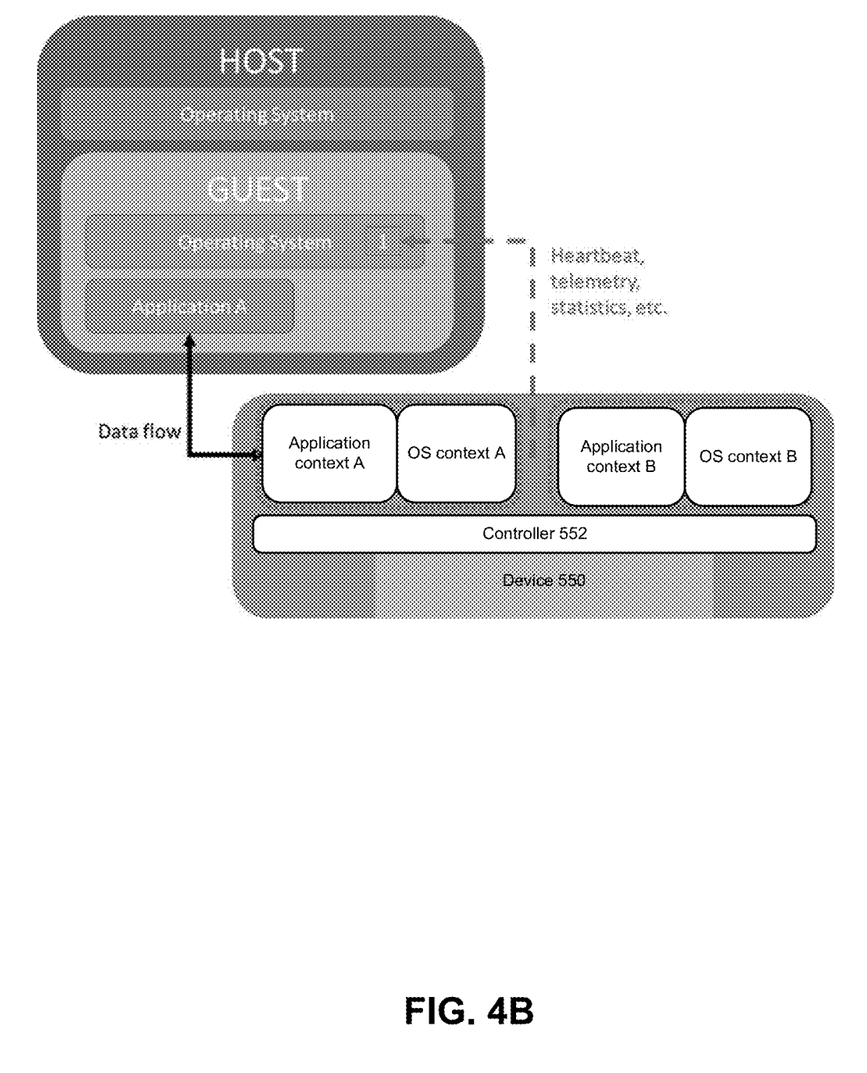

FIG. 4B depicts an example system. In this example, device 550 is programmed with application and OS context A and application and OS context B. In some examples, application context A can include a uPASID value whereas OS context A can include sPASID value. Similarly, application context B can include a uPASID value whereas OS context B can include sPASID value. Context A and context B can be used for device 550 to write to or read from user space and kernel space memory of different guest VMs in some examples.

Although examples are described with respect to SIOV, an virtualized device interface can be used such as SR-IOV or Multi-Root IOV (MR-IOV) or PCIe transactions. Multiple Root I/O Virtualization (MR-IOV) and Sharing Specification, revision 1.0, May 12, 2008, from the PCI Special Interest Group (SIG), is a specification for sharing PCI Express (PCIe) devices among multiple computers.

Figure 5:
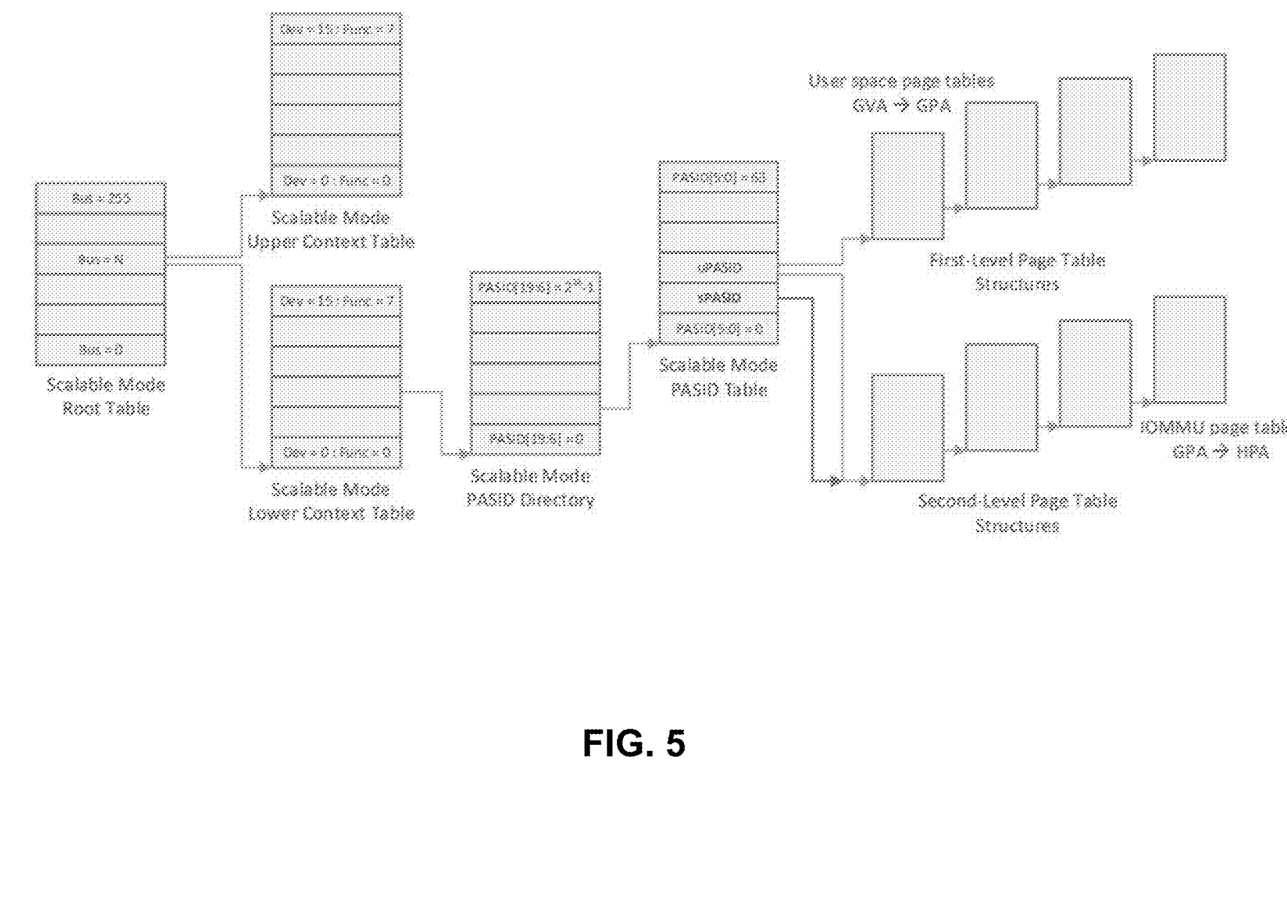
FIG. 5 depicts a configuration of a system.

FIG. 5 depicts an example manner of address remapping for kernel memory access. A host IOMMU driver and host device driver can configure association between uPASID and user space and IOMMU page tables. In this example, uPASID has a pointer to user space and IOMMU page tables whereas sPASID has pointer to an IOMMU page table. uPASID can be used to translate addresses for guest shared virtual memory (SVM) access (e.g., GVA-to-GPA and GPA-to-HPA). In some examples, uPASID can be used to identify an address translation table for GVA-to-GPA whereas sPASID can be used to identify an address translation table for GPA-to-HPA translation if a virtual IOMMU is not present in the VM or guest IOVA (GIOVA)-to-HPA translations if a virtual IOMMU is present in the VM. With Virtual IOMMU enabled, instead of GPA-to-HPA conversion table, a GIOVA-to-HPA conversion table can be used.

An example of configuration and usage can be as follows. At (1), a VMM can assign a device ADI (as part of a SIOV virtual device (VDEV)) to a VM along with a virtual IOMMU. At (2), initially, the VDEV composition module (VDCM) programs the sPASID of the ADI to point to VM's GPA-to-HPA translation (if vIOMMU is not used) or to a device-specific GIOVA-to-HPA translation (if vIOMMU is used). At (3), if the guest driver pins memory for DMA operations (e.g., creates GIOVA-to-GPA mapping for the ADI), the IOMMU driver updates the GIOVA-to-HPA translation table, which is virtualized by the VMM. In this case, upstream transactions from the ADI can be tagged with the sPASID. A GIOVA-to-HPA translation table can refer to a same table as GPA-to-HPA translation but GPA-to-HPA translation table addresses an entire guest physical memory, whereas GIOVA-to-HPA table may address some limited pages and not the entire GPA-to-HPA translation table. If the guest driver assigns the ADI to a user space application, the guest driver can configure a uPASID on the ADI to point to the GVA-to-GPA translation table which can be virtualized by the VMM. In some examples, VDCM can configure the uPASID to point to both GVA-to-GPA and GPA-to-HPA tables (to perform the nested translation). In this case, shared virtual memory (SVM) transactions from the ADI can be tagged with uPASID but certain upstream transactions (e.g., telemetry, heartbeat, etc.) from the ADI can also be tagged with sPASID.

Figure 6:
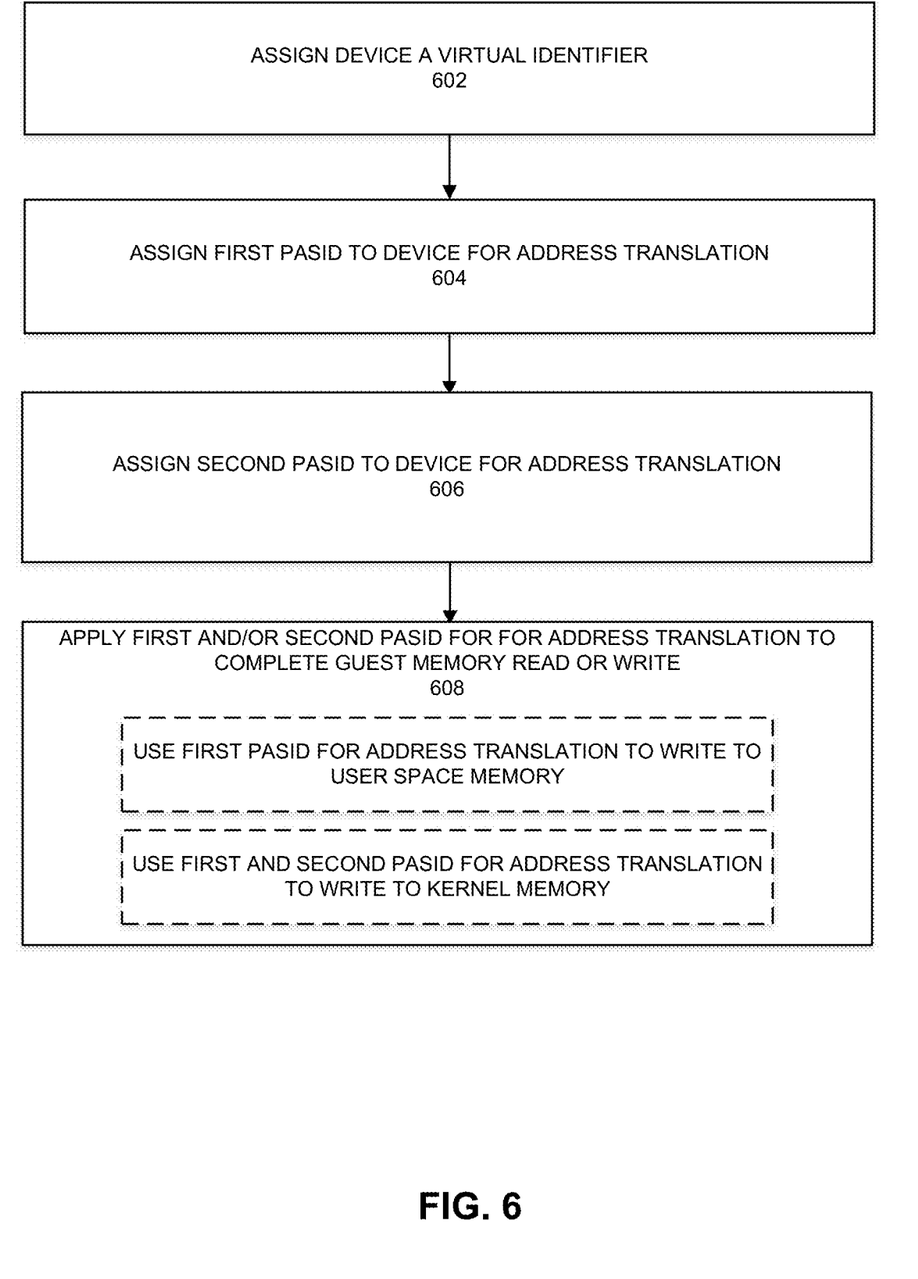
FIG. 6 depicts a process.

FIG. 6 depicts an operation of an example process. At 602, a device can be assigned a virtual device identifier. For example, a VMM or hypervisor can assign a device an ADI or a PF or VF. The device can be connected to a computing platform using a device interface such as PCIe. SIOV, SR-IOV, or MR-IOV can be used to provide device virtualization. At 604, a first PASID can be configured for use by the device for two level translation from GVA-to-GPA and GPA-to-HPA to permit access to user space memory of a guest VM. For example, the first PASID can be a uPASID and the uPASID can be accessed and programmed by a guest OS or driver. At 606, a second PASID can be configured for use by the device that when used with the first PASID can provide for two level translation from GVA-to-GPA and GPA-to-HPA to permit access to user kernel memory of a guest VM. For example, the second PASID can be an sPASID that is programmed by a hypervisor and a guest OS or driver may not access or change it. The first PASID can be used to access a translation table from GVA-to-GPA and the second PASID can be used to access a translation table from GPA-to-HPA or, if a virtual IOMMU is present in the VM, access to a translation table from GIOVA-to-HPA. At 608, in response to a request for the device to write or read from an address in memory of a guest VM, either first or second PASIDs can be used depending on whether the memory region is user space or kernel space. If the device to write or read is from an address in user space memory of a guest VM, the first PASID can be used for address translation from GVA-to-HPA. If the device to write or read is from an address in kernel space memory of a guest VM, the first and second PASIDs can be used for address translation from GVA-to-GPA and GPA-to-HPA or, if vIOMMU is used by the VM, from IOVA-to-HPA. Based on an address translation, the device can read or write to memory of the guest VM.

Figure 7:
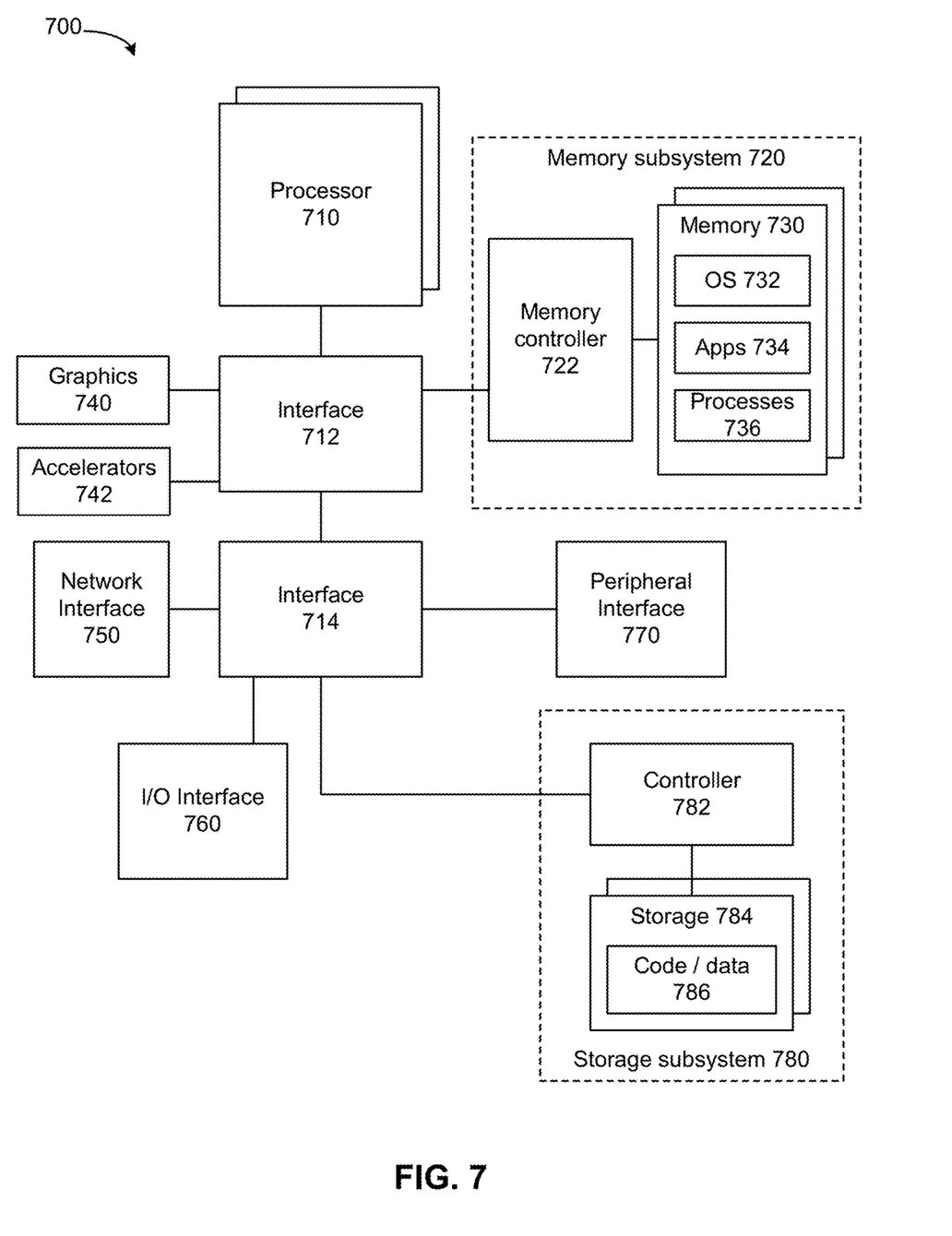
FIG. 7 depicts a system.

FIG. 7 depicts an example system. The system can use embodiments described herein to provide a device with access to user or kernel space memory using techniques described herein. For example the encoder can positioned in any portion of the system including but not limited to an accelerator, CPU, or network interface. System 700 includes processor 710, which provides processing, operation management, and execution of instructions for system 700. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

Processor 710 can include one or more cores. A core can be an execution core or computational engine that is capable of executing instructions. A core can have access to its own cache and read only memory (ROM), or multiple cores can share a cache or ROM. Cores can be homogeneous and/or heterogeneous devices. Any type of inter-processor communication techniques can be used, such as but not limited to messaging, inter-processor interrupts (IPI), inter-processor communications, and so forth. Cores can be connected in any type of manner, such as but not limited to, bus, ring, or mesh. A core may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In some examples, processor 710 includes an XPU (or xPU). An XPU can include one or more of: a graphics processing unit (GPU), general purpose GPU (GPGPU), field programmable gate arrays (FPGA), Accelerated Processing Unit (APU), accelerator or other processor.

In one example, system 700 includes interface 712 coupled to processor 710, which can represent a higher speed interface or a high throughput interface for system components that needs higher bandwidth connections, such as memory subsystem 720 or graphics interface components 740, or accelerators 742. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080 p), retina displays, 4K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Accelerators 742 can be a programmable and/or fixed function offload engine that can be accessed or used by a processor 710 or network interface 750. For example, an accelerator can include one or more offload processors described herein. For example, an accelerator among accelerators 742 can provide compression (DC) capability, cryptography services such as public key encryption (PKE), cipher, hash/authentication capabilities, decryption, or other capabilities or services. In some embodiments, in addition or alternatively, an accelerator among accelerators 742 provides field select controller capabilities as described herein. In some cases, accelerators 742 can be integrated into a CPU socket (e.g., a connector to a motherboard or circuit board that includes a CPU and provides an electrical interface with the CPU). For example, accelerators 742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 742 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 720 represents the main memory of system 700 and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

In some examples, OS 732 can determine a capability of a device associated with a device driver. For example, OS 732 can receive an indication of a capability of a device (e.g., NIC 750 or accelerator 742) to configure a NIC 750 or accelerator 742 to perform any of the capabilities described herein (e.g., data compression or selection of compression modes). OS 732 can request a driver to enable or disable NIC 750 or accelerator 742 to perform any of the capabilities described herein. In some examples, OS 732, itself, can enable or disable NIC 750 or accelerator 742 to perform any of the capabilities described herein. OS 732 can provide requests (e.g., from an application or VM) to NIC 750 to utilize one or more capabilities of NIC 750 or accelerator 742. For example, any application can request use or non-use of any of capabilities described herein by NIC 750 or accelerator 742.

In some examples, an OS can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others.

Note that any reference to a VM can refer more generally to a virtualized execution environment (VEE). A VEE can refer to at least a virtual machine or a container. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an operating system (OS) or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux and Windows Server operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. The isolated nature of containers provides several benefits. First, the software in a container will run the same in different environments. For example, a container that includes PHP and MySQL can run identically on both a Linux computer and a Windows machine. Second, containers provide added security since the software will not affect the host operating system. While an installed application may alter system settings and modify resources, such as the Windows registry, a container can only modify settings within the container.

Various resources of system 700 can perform applications or microservices. Microservices can include a decomposition of a monolithic application into small manageable well-defined services. A microservice can be characterized by one or more of: use of fine-grained interfaces (to independently deployable services), polyglot programming (e.g., code written in multiple languages to capture additional functionality and efficiency not available in a single language), or lightweight container or virtual machine deployment, and decentralized continuous microservice delivery. Microservices have many benefits that is driving rapid adoption. The benefits of microservices also drive new complexity and processing overhead that needs to be managed. Overall the benefits from an application developer's perspective outweigh the associated complexity.

In some examples, an application can be composed of microservices, where each microservice runs in its own process and communicates using protocols (e.g., an HTTP resource API, message service, remote procedure calls (RPC), JavaScript Object Notation (JSON), Thrift, JSON or gRPC). Microservices can be independently deployed using centralized management of these services. The management system may be written in different programming languages and use different data storage technologies. A microservice can be characterized by one or more of: use of fine-grained interfaces (to independently deployable services), polyglot programming (e.g., code written in multiple languages to capture additional functionality and efficiency not available in a single language), or lightweight container or virtual machine deployment, and decentralized continuous microservice delivery. Various microservices can be deployed cloud native in container-based environments.

Some examples processor 710 or NIC 750 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator). An IPU or DPU can include a network interface with one or more programmable or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 700 includes interface 714, which can be coupled to interface 712. In one example, interface 714 represents an interface circuit, which can include stand-alone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a device that is in the same data center or rack or a remote device, which can include sending data stored in memory. Network interface 750 can receive data from a remote device, which can include storing received data into memory. Various embodiments can be used in connection with network interface 750, processor 710, and memory subsystem 720.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 786 in a persistent state (e.g., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (e.g., the value or state of the data is indeterminate if power is interrupted to system 700). In one example, storage subsystem 780 includes controller 782 to interface with storage 784. In one example controller 782 is a physical part of interface 714 or processor 710 or can include circuits or logic in both processor 710 and interface 714.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes a cache. A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 700. More specifically, power source typically interfaces to one or multiple power supplies in system 700 to provide power to the components of system 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 700 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment.

The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Figure 8:
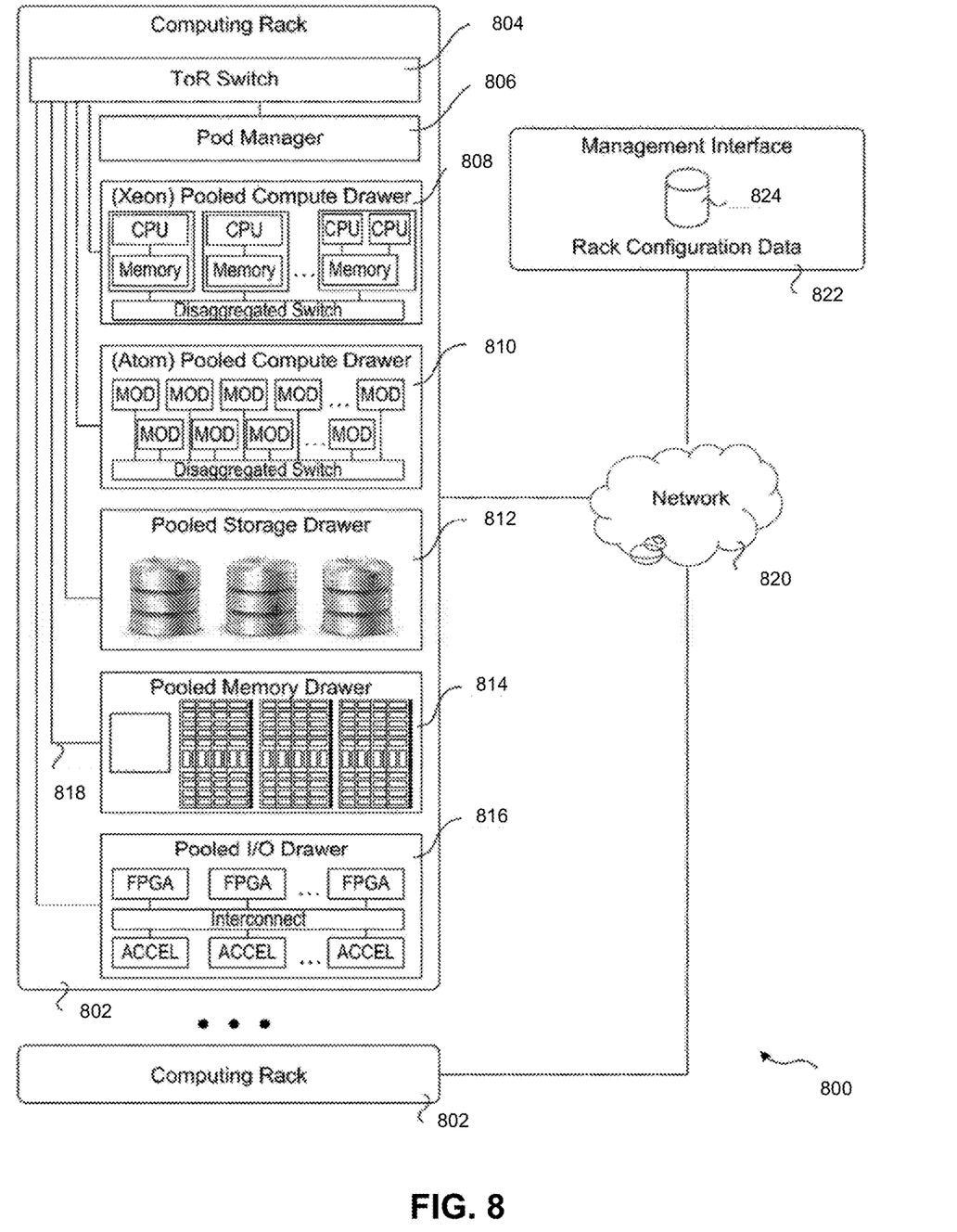
FIG. 8 depicts an example environment.

FIG. 8 depicts an environment 800 that includes multiple computing racks 802, each including a Top of Rack (ToR) switch 804, a pod manager 806, and a plurality of pooled system drawers. The environment can use embodiments described herein to provide a device with access to user or kernel space memory using techniques described herein. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 808, and Intel® ATOM™ pooled compute drawer 810, a pooled storage drawer 812, a pooled memory drawer 814, and a pooled I/O drawer 816. Each of the pooled system drawers is connected to ToR switch 804 via a high-speed link 818, such as an Ethernet link and/or a Silicon Photonics (SiPh) optical link.

Multiple of the computing racks 802 may be interconnected via their ToR switches 804 (e.g., to a pod-level switch or data center switch), as illustrated by connections to a network 820. In some embodiments, groups of computing racks 802 are managed as separate pods via pod manager(s) 806. In one embodiment, a single pod manager is used to manage all of the racks in the pod. Alternatively, distributed pod managers may be used for pod management operations.

Environment 800 further includes a management interface 822 that is used to manage various aspects of the environment. This includes managing rack configuration, with corresponding parameters stored as rack configuration data 824.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes an apparatus comprising: a device comprising: circuitry to permit or deny the device to write-to or read-from kernel space memory of a virtualized execution environment by use of multiple process identifiers.

Example 2 includes any example, wherein the device is communicatively coupled with the virtualized execution environment in a manner consistent with one or more of: Single Root IO Virtualization (SR-IOV), Scalable I/O Virtualization (SIOV), or PCI express (PCIe).

Example 3 includes any example, wherein to control write or read operations to kernel space memory of a virtualized execution environment by the device by use of multiple process identifiers, the circuitry is to perform an address translation based on a first process identifier and second process identifier associated with the virtualized execution environment.

Example 4 includes any example, wherein the first process identifier is used for translation of an address in a guest address space and the first and second process identifiers are used for translation of an address into kernel address space.

Example 5 includes any example, wherein the first process identifier is programmable by a guest operating system (OS) associated with the virtualized execution environment and the second process identifier is programmable by a hypervisor or virtual machine manager (VMM) but not programmable by the virtualized execution environment.

Example 6 includes any example, wherein the translation of an address in a guest address space comprises a translation from guest virtual address to host physical address.

Example 7 includes any example, wherein the translation of an address in the kernel address space comprises a translation of a guest virtual address to a guest physical address using a translation table identified by the first process identifier and a second translation from guest physical address or guest IO virtual address (IOVA) to host physical address using a translation table identified by the second process identifier.

Example 8 includes any example, wherein the device comprises one or more of: a network interface controller, infrastructure processing unit (IPU), data processing unit (DPU), compression or decompression offload circuitry, encryption or decryption offload circuitry, work load manager, XPU, storage controller, graphics processing unit, or memory controller.

Example 9 includes any example, comprising a server, wherein the server is communicatively coupled to the device and is to execute a virtual machine manager (VMM) to allocate at least one process identifier.

Example 10 includes any example, and includes a computer-readable medium comprising instructions stored thereon, that if executed by one or more processors, cause the one or more processors: configure a device with permission or denial to write-to or read-from kernel space memory of a virtualized execution environment by use of multiple process identifiers.

Example 11 includes any example, wherein the device is communicatively coupled with the virtualized execution environment in a manner consistent with one or more of: Single Root IO Virtualization (SR-IOV), Scalable I/O Virtualization (SIOV), or PCI express (PCIe).

Example 12 includes any example, wherein a first process identifier is programmable by a guest operating system (OS) associated with the virtualized execution environment.

Example 13 includes any example, wherein a second process identifier is programmable by a hypervisor or virtual machine manager (VMM) but not programmable by the virtualized execution environment.

Example 14 includes any example, wherein the multiple process identifiers refer to address translation tables for use to convert an address to an address associated with the kernel space memory.

Example 15 includes any example, and includes instructions stored thereon, that if executed by one or more processors, cause the one or more processors: configure the device with permission or denial to write-to or read-from user space memory of the virtualized execution environment by use of a process identifier.

Example 16 includes any example, and includes a method comprising: controlling access by a device to a memory region allocated to guest address space for a virtualized execution environment by use of a first process identifier and controlling access by the device to a memory region allocated to kernel address space for the virtualized execution environment by use of the first process identifier and a second process identifier.

Example 17 includes any example, wherein the first process identifier is programmable by a guest operating system (OS) associated with the virtualized execution environment.

Example 18 includes any example, wherein the second process identifier is programmable by a hypervisor or virtual machine manager (VMM) but not programmable by the virtualized execution environment.

Example 19 includes any example, and includes controlling access by the device to a memory region allocated to guest address space by an address translation based on the first process identifier.

Example 20 includes any example, and includes controlling access by the device to a memory region allocated to kernel address space by address translations based on the first process identifier and the second process identifier.

What is claimed is:

1. An apparatus comprising:
   a device comprising:
   circuitry to permit or deny the device to write-to or read-from kernel space memory associated with a virtualized execution environment by use of multiple process identifiers, wherein the virtualized execution environment comprises a virtual machine or container, wherein a first process identifier of the multiple process identifiers is to identify a first address translation table, a second process identifier of the multiple process identifiers is to identify a second address translation table, and wherein to permit or deny the device to write-to or read-from kernel space memory associated with the virtualized execution environment by use of multiple process identifiers comprises perform an address translation to an address in a guest address space based on the first process identifier and perform an address translation to an address in kernel address space based on both the first process identifier and the second process identifier.

2. The apparatus of claim 1, wherein the device is communicatively coupled with the virtualized execution environment in a manner consistent with one or more of: Single Root IO Virtualization (SR-IOV), Scalable I/O Virtualization (SIOV), or PCI express (PCIe).

3. The apparatus of claim 1, wherein:
   to control write or read operations to the kernel space memory associated with the virtualized execution environment by the device by use of multiple process identifiers, the circuitry is to perform an address translation based on a first process identifier of the multiple process identifiers and a second process identifier of the multiple process identifiers.

4. The apparatus of claim 1, wherein
   the first process identifier is programmable by a guest operating system (OS) associated with the virtualized execution environment and
   the second process identifier is programmable by a hypervisor or virtual machine manager (VMM) but not programmable by the virtualized execution environment.

5. The apparatus of claim 1, wherein the translation of the address in the guest address space comprises a translation from guest virtual address to host physical address.

6. The apparatus of claim 1, wherein the translation of the address in the kernel address space comprises a translation of a guest virtual address to a guest physical address using the first address translation table identified by the first process identifier and a second translation from guest physical address or guest input output (IO) virtual address (IOVA) to host physical address using the second address translation table identified by the second process identifier.

7. The apparatus of claim 1, wherein the device comprises one or more of: a network interface controller, infrastructure processing unit (IPU), data processing unit (DPU), compression or decompression offload circuitry, encryption or decryption offload circuitry, work load manager, XPU, storage controller, graphics processing unit, or memory controller.

8. The apparatus of claim 1, comprising a server, wherein the server is communicatively coupled to the device and is to execute a virtual machine manager (VMM) to allocate at least one process identifier.

9. At least one non-transitory computer-readable medium comprising instructions stored thereon, that if executed by one or more processors, cause the one or more processors:
   configure a device with permission or denial to write-to or read-from kernel space memory of a virtualized execution environment by use of multiple process identifiers for the virtualized execution environment, wherein a single virtualized execution environment is associated with the multiple process identifiers, wherein a first process identifier of the multiple process identifiers is to identify a first address translation table, a second process identifier of the multiple process identifiers is to identify a second address translation table, and wherein the permission or denial to write-to or read-from kernel space memory of the virtualized execution environment by use of multiple process identifiers for the virtualized execution environment comprises perform an address translation to an address in a guest address space based on the first process identifier and perform an address translation to an address in kernel address space based on both the first process identifier and the second process identifier.

10. The at least one non-transitory computer-readable medium of claim 9, wherein the device is communicatively coupled with the virtualized execution environment in a manner consistent with one or more of: Single Root IO Virtualization (SR-IOV), Scalable I/O Virtualization (SIOV), or PCI express (PCIe).

11. The at least one non-transitory computer-readable medium of claim 9, wherein a first process identifier of the multiple process identifiers is programmable by a guest operating system (OS) associated with the virtualized execution environment.

12. The at least one non-transitory computer-readable medium of claim 9, wherein a second process identifier of the multiple process identifiers is programmable by a hypervisor or virtual machine manager (VMM) but not programmable by the virtualized execution environment.

13. The at least one non-transitory computer-readable medium of claim 9, wherein the multiple process identifiers refer to address translation tables for use to convert an address to an address associated with the kernel space memory.

14. The at least one non-transitory computer-readable medium of claim 9, comprising instructions stored thereon, that if executed by one or more processors, cause the one or more processors:
   configure the device with permission or denial to write-to or read-from user space memory of the virtualized execution environment by use of a single process identifier.

15. A method comprising:
controlling access by a device to a memory region allocated to guest address space for a virtualized execution environment by use of a first process identifier and
controlling access by the device to a memory region allocated to kernel address space in kernel memory for the virtualized execution environment by use of the first process identifier and a second process identifier, wherein the first process identifier is to identify a first address translation table, wherein the second process identifier is to identify a second address translation table, wherein the controlling access by the device to the memory region allocated to guest address space by an address translation based on the first process identifier, and wherein the controlling access by the device to the memory region allocated to kernel address space in kernel memory for the virtualized execution environment by use of the first process identifier and the second process identifier comprises performing an address translation to an address in kernel address space based on both the first process identifier and the second process identifier.

16. The method of claim 15, comprising:
a guest operating system (OS) associated with the virtualized execution environment programming the first process identifier.

17. The method of claim 15, wherein the second process identifier is programmable by a hypervisor or virtual machine manager (VMM) but not programmable by the virtualized execution environment.

18. The method of claim 15, comprising:
controlling access by the device to a kernel memory region allocated to kernel address space by address translations based on the first process identifier and the second process identifier.

19. The at least one non-transitory computer-readable medium of claim 9, wherein the permission or denial to write-to or read-from kernel space memory of a virtualized execution environment by use of multiple process identifiers for the virtualized execution environment comprises:
based on the device being accessible as a virtualized device using a Scalable I/O Virtualization (SIOV) assignable device interface (ADI), permitting simultaneous user space and kernel space memory accesses to respective first and second regions in memory by the virtualized execution environment.

* * * * *